United States Patent
Chan et al.

(10) Patent No.: US 8,019,992 B2
(45) Date of Patent: Sep. 13, 2011

(54) METHOD FOR GRANTING USER PRIVILEGES IN ELECTRONIC COMMERCE SECURITY DOMAINS

(75) Inventors: Victor S. Chan, Thornhill (CA); Darshanand Khusial, Mississauga (CA); Lev Mirlas, Thornhill (CA); Wesley M. Philip, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 2612 days.

(21) Appl. No.: 10/726,766

(22) Filed: Dec. 3, 2003

(65) Prior Publication Data

US 2004/0260622 A1      Dec. 23, 2004

(30) Foreign Application Priority Data

Jun. 17, 2003   (CA) .................................... 2432667

(51) Int. Cl.
*H04L 29/06*        (2006.01)
(52) U.S. Cl. ..................................................... 713/166
(58) Field of Classification Search ................ 705/26; 726/28, 5; 713/166
See application file for complete search history.

(56) References Cited

U.S. PATENT DOCUMENTS

| | | | |
|---|---|---|---|
| 5,604,490 A | 2/1997 | Blakley et al. ................ 713/200 |
| 6,021,496 A | 2/2000 | Dutcher et al. ............... 713/202 |
| 6,119,230 A | 9/2000 | Carter .......................... 713/200 |
| 6,158,010 A * | 12/2000 | Moriconi et al. ................. 726/1 |
| 6,453,353 B1 * | 9/2002 | Win et al. ..................... 709/229 |
| 6,760,711 B1 * | 7/2004 | Gillett et al. .................... 705/64 |
| 7,028,180 B1 * | 4/2006 | Aull et al. ..................... 713/156 |
| 7,062,472 B2 * | 6/2006 | Dan et al. ........................ 705/80 |
| 2001/0032154 A1 * | 10/2001 | Schummer ..................... 705/30 |
| 2002/0069123 A1 * | 6/2002 | Soderlind et al. .............. 705/26 |
| 2004/0205554 A1 * | 10/2004 | Goswami et al. ............. 715/513 |

* cited by examiner

*Primary Examiner* — Farid Homayounmehr
(74) *Attorney, Agent, or Firm* — Winstead, P.C.

(57) ABSTRACT

An electronic commerce system supports web sites including on-line stores that are accessible by a set of customers and organizations to which stores may belong. Organizations may be defined in accordance with a tree structure. Users accessing a web site are provided with access roles for organizations. The access roles for a user define the portions of the web site for which the user has access privileges. The tree structure of the web site is used to define security domains for users. Users may have access roles of registered customer or administrator. Users without any roles in a security domain are accorded guest privileges within that domain.

4 Claims, 2 Drawing Sheets

METHOD FOR GRANTING USER PRIVILEGES IN ELECTRONIC COMMERCE SECURITY DOMAINS

CROSS REFERENCE TO RELATED APPLICATIONS

This Application claims priority under 35 U.S.C. §119(a) to Canadian Patent Application No. 2432667 filed Jun. 17, 2003, which is hereby incorporated herein by reference in its entirety.

TECHNICAL FIELD

The present invention relates generally to electronic commerce web-based systems and in particular to the granting of user privileges in security domains defined in such systems.

BACKGROUND INFORMATION

In electronic commerce web-based applications (e-commerce web sites), a user is often granted privileges for certain web pages accessible by the user. Such privileges may govern the information that a user may access or modify on an e-commerce web site.

In computer network contexts, there are different approaches for dividing computer systems or programs into subsets for which different users may be granted different access privileges. For example, such systems are disclosed in U.S. Pat. No. 5,604,490 (Blakley, et al., Feb. 18, 1997) and U.S. Pat. No. 6,119,230 (Carter, Sep. 12, 2000), both of which are incorporated herein by reference. In e-commerce sites that run on a single application, however, typically only one security domain is supported. When a user registers on one of these sites, the user's identity is added to a common registry for the site and the user is accorded a single set of privileges throughout the site.

For such a single security domain site hosting more than one on-line store, each user will be accorded the same privileges in each of the hosted on-line stores. It is frequently desirable to have different, unrelated on-line stores hosted on the same site. For such a system it is advantageous to allow for different privileges for the users at the different stores. In addition, in such a single security domain arrangement, a single administrator of the site will typically manage all the users registered to the site. It is advantageous, however, for a system to potentially restrict certain administrators to the management of users for a particular subset of the security domain, as opposed to the entire security domain.

It is therefore desirable to provide an e-commerce system that permits a single site to be divided into different security domains and in which users may be accorded privileges in a manner that corresponds to the relationships of the stores supported by the e-commerce site.

SUMMARY

Accordingly, the present invention provides a system and method for improved management of user privileges in electronic commerce security domains.

According to another aspect of the present invention there is provided a computer program product for implementing electronic commerce systems, each electronic commerce system including a web site being accessible by one or more users and including a set of on-line stores and a set of organizations, each of the on-line stores being associated with one of the set of organizations, the computer program product including a computer usable medium having computer readable program code "means" embodied in the medium, and including computer readable program code means for representing the users, each user being associated with a unique identity in the system, computer readable program code means for associating a user identity with one of a set of access roles for a security domain, the access role defining access privileges for the user corresponding to the user identity, the security domain including a subset of the set of organizations and the on-line stores associated with the organizations in the subset, and computer readable program code means for granting or denying access to a user attempting to access a portion of the web site by determining the user identity for the user and determining the access role associated with the user identity for the security domain corresponding to the portion of the web site subject to the access attempt.

According to another aspect of the present invention there is provided the above computer program product further including computer readable program code means for carrying out the determination of the access role associated with a user identity for a security domain at user logon time.

According to another aspect of the present invention there is provided the above computer program product in which the set of access roles includes registered customer and administrator roles.

According to another aspect of the present invention there is provided the above computer program product, further including computer readable program code means to define the set of organizations as a tree structure, in which the computer readable program code means for associating a user identity with one of a set of access roles further includes computer readable program code means for associating the user identity with the access role for a selected one of the set of organizations, and further including computer readable program code means for defining the security domain to include the selected organization and those organizations in the set that are descendants of the selected organization.

According to another aspect of the present invention there is provided the above computer program product in which the computer readable program code means for associating a user identity with one of a set of accessible roles includes computer readable program code means for maintaining and providing look up functionality for a table including rows including data representing user identity, organization, and access role associations.

According to another aspect of the present invention there is provided a computer program product further including computer readable program code means for providing user identities with associated access roles at user registration to the site.

According to another aspect of the present invention there is provided a system for implementing electronic commerce systems, each electronic commerce system including a web site being accessible by one or more users and including a set of on-line stores and a set of organizations, each of the on-line stores being associated with one of the set of organizations, the system including:

means for representing the users, each user being associated with a unique identity in the system, means for associating a user identity with one of a set of access roles for a security domain, the access role defining access privileges for the user corresponding to the user identity, the security domain including a subset of the set of organizations and the on-line stores associated with the organizations in the subset, and means for granting or denying access to a user attempting to access a portion of the web site by determining the user identity for the user and determining the access role associated with the user identity for the security domain corresponding to the portion of the web site subject to the access attempt.

According to another aspect of the present invention there is provided a method for providing user access to a portion of a web site implemented by an electronic commerce system, the web site being accessible by one or more users and including a set of on-line stores and a set of organizations, each of the on-line stores being associated with one of the set of organizations, the method including the steps of:

associating each user with a unique identity in the system, associating a user identity with one of a set of access roles for a security domain, the access role defining access privileges for the user corresponding to the user identity, the security domain including a subset of the set of organizations and the on-line stores associated with the organizations in the subset, and granting or denying access to a user attempting to access a portion of the web site by determining the user identity for the user and determining the access role associated with the user identity for the security domain corresponding to the portion of the web site subject to the access attempt.

According to another aspect of the present invention there is provided the above method in which:

the set of organizations is a tree structure, the step of associating a user identity with one of a set of access roles further includes the step of associating the user identity with the access role for a selected one of the set of organizations, the security domain includes the selected organization and those organizations in the set that are descendants of the selected organization, and the step of granting or denying access by determining the access role associated with the user identity for the security domain includes determining the access role for the user identity by traversing the tree structure of organizations commencing at the selected organization and including the ancestor organizations to the selected organization.

According to another aspect of the present invention there is provided a computer program product including a computer-readable signal-bearing medium, the medium including means for accomplishing the above method and in which the medium is a recordable data storage medium or a modulated carrier signal (the signal may be a transmission over a network such as the Internet).

The present invention thus allows for user privileges to be defined in a manner that reflects the structure of e-commerce web sites and permits multiple security domains to be defined for a single site. In addition, users may have different privileges under a single identity for different security domains within a site.

BRIEF DESCRIPTION OF THE DRAWINGS

In drawings which illustrate by way of example only an embodiment of the invention.

DETAILED DESCRIPTION

One embodiment is a web-based e-commerce system that permits e-commerce sites to be implemented. Such an e-commerce site, implemented with the system of such an embodiment, can have a defined structure that includes organizations and stores. Organizations and stores in an e-commerce site defined by the system of such an embodiment can be arranged in a hierarchical manner. Organizations may "own" assets in the system in this embodiment. Such assets include stores. Each store is owned by a single organization. An organization may own multiple stores. Only organizations are allowed to own stores. Organizations may have one or more sub-organizations known as descendant organizations. An owner of an organization is a parent organization. Each organization has only one parent organization, except a single organization that has no parent. This organization is known as the "root organization" and is located at the top of the hierarchy of organizations.

Figure 1:
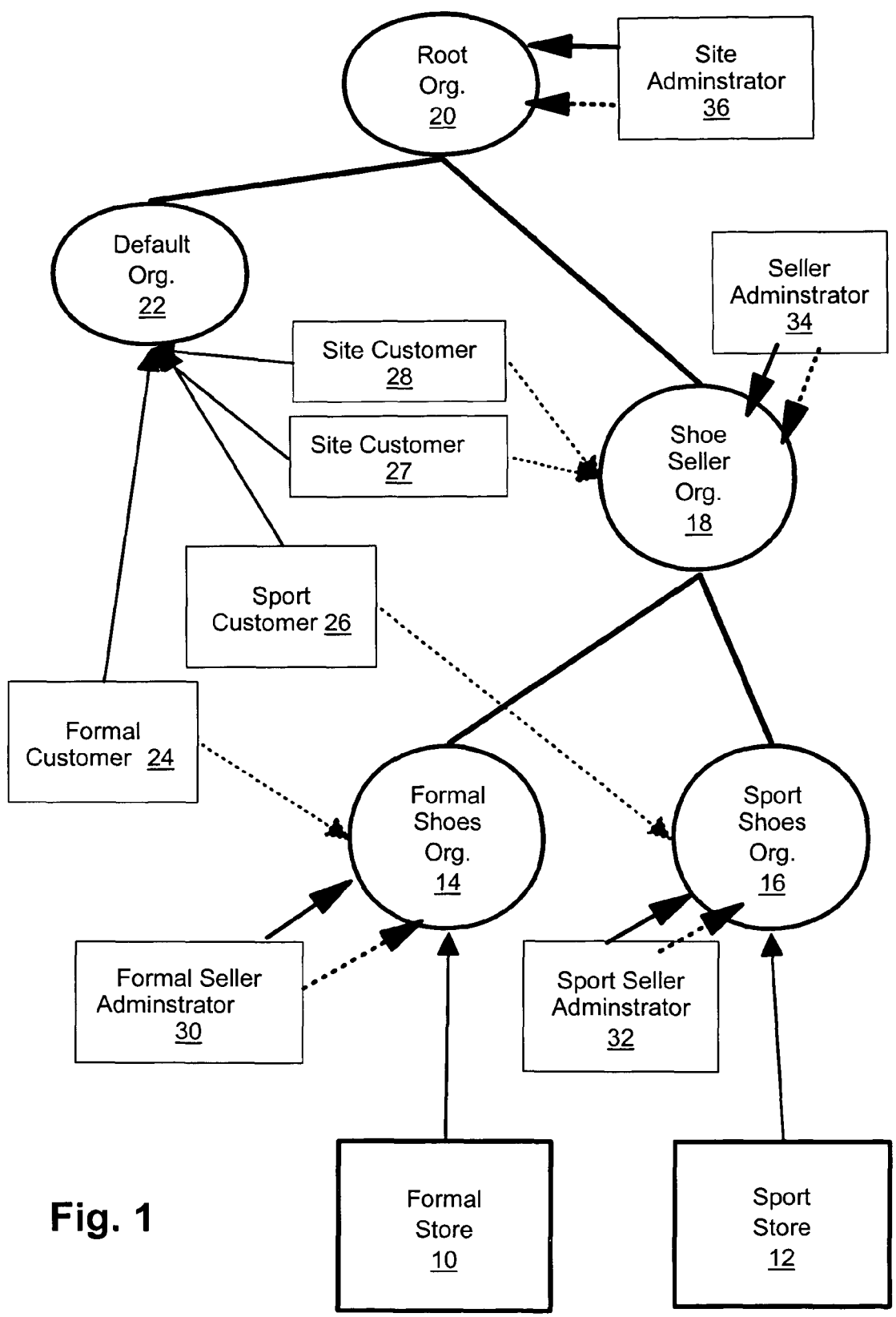
FIG. 1 is a block diagram showing a simple example configuration of an e-commerce system in accordance with an embodiment of the present invention.

An example of an e-commerce site for hosting shoe stores, defined in accordance with the system of one embodiment, is shown in the block diagram of FIG. 1. The example shows two stores for selling two different types of shoes: formal store 10 and sport store 12. Formal store 10 is owned by formal shoes organization 14 and sport store 12 is owned by sport shoe organization 16. Both organizations 14, 16 are owned by shoe seller organization 18. Shoe seller organization 18 is, in turn, owned by root organization 20.

As may be seen in FIG. 1, the relationships between the organizations and the stores define a tree structure in which the stores are located at the bottom of the structure. The root node of the tree is root organization 20. All the organizations for the e-commerce site are descendants of root organization 20.

In a web site implemented using the system of one embodiment, users are able to access the web site in different ways. Users may access the e-commerce site without registering or logging in. Such users are referred to as guest customers. Alternatively, users may register or log in at the e-commerce site.

One mechanism for registering is for a user to register at an on-line store using a self-provisioning mechanism. Upon registration, the user may automatically be given privileges in one or more security domains. Alternatively, a registered user may be given privileges in a security domain by an administrator.

The system of one embodiment uses both authentication and authorization techniques to ensure that users are correctly associated with an identity in the web site of the system and that users are provided with access to the appropriate portions of the web site. Upon authentication to a store, the system of one embodiment verifies the user challenge information such as logon name and password against an authentication repository such as a database or Lightweight Directory Access Protocol (LDAP) server. In one embodiment, this authentication of a user is not solely sufficient to permit the user to have access to the store (or other portion of the web site). In addition, a check is made to ensure that the user has the privilege to access the security domain to which the store belongs. This check is carried out by determining if there is at least one access role for the user for the particular security domain, as is described in more detail below.

The system of one embodiment makes it possible for e-commerce web sites to be designed in a way that meets the business requirements of the organizations setting up the web sites. Different rules may be designed to provide differing privileges for users, depending on the requirements of the organizations and the types of users that are expected to use the web sites. The system structure which permits this flexible assignment of user privileges is set out below.

The system of one embodiment permits e-commerce sites to be implemented in which users are represented as being associated with organizations and are assigned roles. The organization and role information for a user is used to define the privileges accorded to the user.

In an e-commerce site in accordance with one embodiment, users are represented to be either administrators or customers. Customers in turn may be represented as registered or guest customers. Examples of the e-commerce site representations for both administrator and registered customer users are shown in the block diagram of FIG. 1. Formal customer 24, sport customer 26 and site customers 27 and 28 each correspond to registered customer representations in the e-commerce site. As may be seen in FIG. 1, customer users are represented as belonging (solid arrow) to default organization 22.

FIG. 1 also shows several sets of administrator user representations: formal seller administrator 30, sport seller administrator 32, seller administrator 34 and site administrator 36. In e-commerce sites implemented with the system of one embodiment, a user representation always belongs to an organization. In the example of FIG. 1, formal seller administrator 30 belongs to formal shoes organization 14, sport seller administrator 32 belongs to sport shoes organization 16 and seller administrator 34 and site administrator 36 belong to shoe seller organization 18 and root organization 20, respectively.

The system of one embodiment permits roles to be assigned to users in the context of an organization. A user can play a role in the organization to which the user belongs and can also be granted a role in a different organization. The decision to grant roles in different organizations effectively defines the privileges for the user in the set of on-line stores and organizations supported by a system of one embodiment.

A user assigned a role for a particular organization grants the user rights to a subset of URLs associated with the organization's stores. For example, when a user becomes a registered user in two independent stores (stores that do not share the same parent organization), the user may be granted the registered customer role in each of the two organizations owning the two stores.

As referred to above, some users do not register with an e-commerce site. For such users, there is no record of user profile information and authentication information such as logon ID, password, and the like. In the e-commerce sites implemented with the system of one embodiment, such users are guest customers. Guest customers may become registered customers by logging in or registering when given the opportunity to do so by the e-commerce site. Users without any roles in a security domain are accorded guest privileges within that domain.

As indicated above, it is typical in e-commerce systems to provide users with privileges. Users may be provided with identities in the e-commerce site and the identity is associated with a set of privileges. Where there is such a system of privileges, an e-commerce web site will have one or more security domains. In the context of one embodiment, a security domain is a set of web pages for which users have a defined set of privileges.

In an example of one embodiment, a security domain is defined by a set of related universal resource locators (URLs) for a particular Internet domain or Internet hostname. For example, at the Internet hostname shop.ibm.com, two security domains (one for store A and the other for store B) may be specified by:
i) URLs matching the pattern http://shop.ibm.com/...?...&storeId=A&...
ii) URLs matching the pattern http://shop.ibm.com/...?...&storeId=B&...
where "..." is a wildcard place holder and the storeId URL parameter together with the hostname are used to define the security domains.

Within a security domain there are three types of privileges accorded to users: guest, registered, and administrative. Guest privileges are assigned to users who have a temporary relationship with the security domain (and who do not have access roles of registered customer or administrator in the security domain). Registered privileges are assigned to users who have a permanent relationship with the security domain but do not have any administrative privileges within that domain. Administrative privileges are assigned to users who have a permanent relationship with the security domain and have the ability to perform management operations within the security domain.

Typically, users with guest privileges can perform a limited set of operations in a security domain. For example, such users may browse a catalog or place an isolated order. If a user intends to do various transactions in a store, over a period of time, it makes sense for the user to establish a permanent relationship with the security domain by obtaining registered privileges. In this way, the user can later authenticate to the security domain and view the user's order history, address book, and make use of other e-commerce functions that are made available only to registered users. For example, security domains may be configured to only allow users with registered privileges to access the store's assets, for example the store's catalog or address book. Users with administrative privileges typically may perform management operations such as resetting the password of a user within the security domain.

Access control roles are used to distinguish the type of privileges a user has within a security domain. A user with guest privileges has no access control role within the security domain. A user with registered privileges has a single access control role, Registered Customer role, within that domain. Users with administrative privileges may have one or more administrative roles within a security domain.

As referred to above, since organizations defined using the system of the present invention are hierarchical in nature, security domains are defined to encompass an organization and its descendants. Thus a user is granted the same set of privileges for assets owned by an organization and all its descendants. Thus, a user that plays a particular role in an organization, also plays the role in all of its descendant organizations (including on-line stores owned by such organizations).

Turning to the example of FIG. 1, site customers 27, 28 are both shown (by the dotted arrows) to have roles in shoe seller organization 18. The privileges that are associated with those roles in shoe seller organization 18 for site customers 27, 28 therefore are also accorded to them for the descendants of that node in the tree structure of FIG. 1. Thus, those privileges for site customers 27, 28 apply also for formal shoes organization 14, sport shoes organization 16, formal store 10 and sport store 12.

As the example of FIG. 1 shows, customers given different privileges in stores have roles in organizations that are not common ancestors for the stores. In the example of FIG. 1, formal customer 24 has a role in formal shoes organization 14 and no role in sport shoes organization 16. Conversely, sport customer 26 has a role in sport shoes organization 16 but not in formal shoes organization 14. The result is privileges for formal customer 24 in formal store 10, and privileges for sport customer 26 in sport store 12.

A similar approach is used for administrators. In the example of FIG. 1, seller administrator 34 both belongs to, and is assigned an administrative role for, shoe seller organization 18. This is shown by the pair of arrows: solid arrow (ownership) and dashed arrow (role assignment) between seller administrator 34 and shoe seller organization 18. Consequently, seller administrator 34 has administrator privileges for descendant nodes 10, 12, 14, 16 in the tree structure of FIG. 1. This gives seller administrator 34 privileges as an administrator for all stores and all seller organizations in the application shown in FIG. 1. However, other administrators are able to be given privileges of different scope in the example of FIG. 1. Thus formal seller administrator 30 and sport seller administrator 32 belong to and are given administrator privileges for formal shoes organization 14 and sport shoes organization 16, respectively. These privileges are also extended to the corresponding stores 10, 12. FIG. 1 also shows site administrator 36 belonging to root organization 20 and with administrator privileges for the entire site due to the administrator privileges that are provided as a result of being assigned an administrative role for root organization 20 (represented by dashed arrow to root organization 20).

As the above illustrates, a user is able to have privileged access to a subset of the security domains in an application. The business logic for the e-commerce application being implemented can determine how different users are assigned roles in the site. For example, when a user registers to a store the user may be assigned the registered customer role in that store's organization only. Alternatively, the user may be assigned the role in an ancestor organization of the store's organization, not the immediate organization that owns the store. The logic of the e-commerce implementation may also provide for the user to be assigned roles in organizations that are not in the store's organization ancestral branch at all. Similarly, if a user is to have administrative privileges in multiple security domains, the user is assigned administrative roles in the corresponding organizations.

When a user first enters a new security domain, after previously authenticating in another security domain in the same application, the user may be recognized without requiring re-logon. When a user attempts to access a particular store, the system checks if the user has any roles in the organization that owns this store. If the user does not have a role at this level, it will also check if the user has a role for any of the organization's ancestor organizations. This checking is carried out all the way up to the Root Organization. If the user has the Registered Customer role for any of these organizations, the user is granted registered privileges in this security domain that the user has entered. Similarly, if the user has an administrative role for any of these organizations, the user is accorded administrative privileges in the security domain. If on the other hand, the user does not have any roles in any of these organizations, the user is provided with only guest privileges in the security domain.

This provides for flexibility in defining privileges for users and for ease of use of sites by such users. An example of this flexibility is where the system of one embodiment is used to define a site that implements an on-line marketplace. In such a site, reseller organizations having stores may be defined and channel organizations with channel stores (used to supply the reseller stores) may also be defined. In such a site, a reseller administrator may be defined to belong to a specific reseller organization as an administrator. Such a user may logon once and perform different administrative functions in different stores (security domains) for which the user has the administrator role. The user may also, without changing its identity in the site, order parts from a channel store for which the user has the role of registered customer. This provides the ability to manage the stores and to order the parts that the user needs to fulfill customers' orders received in the user's stores. This means that the user is able to have access to multiple stores/security domains under a single identity.

Advantages achievable with the system of one embodiment, also include the following:

An administrator of a security domain for an e-commerce site has the ability to manage all the individuals registered in that security domain. The user having the administrator role for a security domain is able to list all users in a security domain for which the user has administrative privileges. This is accomplished in the system of one embodiment by running a command to find all the users with the registered customer role at a specified organization and any descendant organization. Once such a list is determined, the user is able to perform various tasks relating to those users such as, for example: sending emails to the users, assigning users to special groups, resetting passwords, and updating addresses of users.

A user's profile information is able to be protected: it is available only to the administrators of the security domains in which the user has been assigned the Registered Customer role. The user's profile information cannot be accessed by administrators who have roles only in other security domains.

Registration may be carried out under a single identity to all the security domains of a site. User profile information is not unnecessarily replicated within the system, but instead, stored in a central repository.

There is an ability to allow an administrator using a single identity to manage the security domains that are necessary for the business logic of the implemented site. An administrator's role for a high-level organization grants the user the authority to manage all of the assets owned by that organization and its sub-organizations.

This invention describes a generic framework that allows a user access to a subset of the security domains in an application. In this way, it is able to support the requirements of a variety of business models. For example, e-commerce models for shopping malls, hosted stores, multiple go to market strategies and marketplaces are all able to implemented with the flexible management of security privileges made possible by the system of the present invention.

In one embodiment, the assignment of roles to users for a web site is recorded in a table with columns reflecting user identity, organization and role. Thus, it is possible for users to be assigned multiple roles in multiple organizations in the site. This table is accessible to the site such that the privileges for the user may be determined by doing a look up in the table.

Implementations of the invention include implementations as a computer system programmed to execute the process or processes described herein, and as a computer program product.

Figure 2:
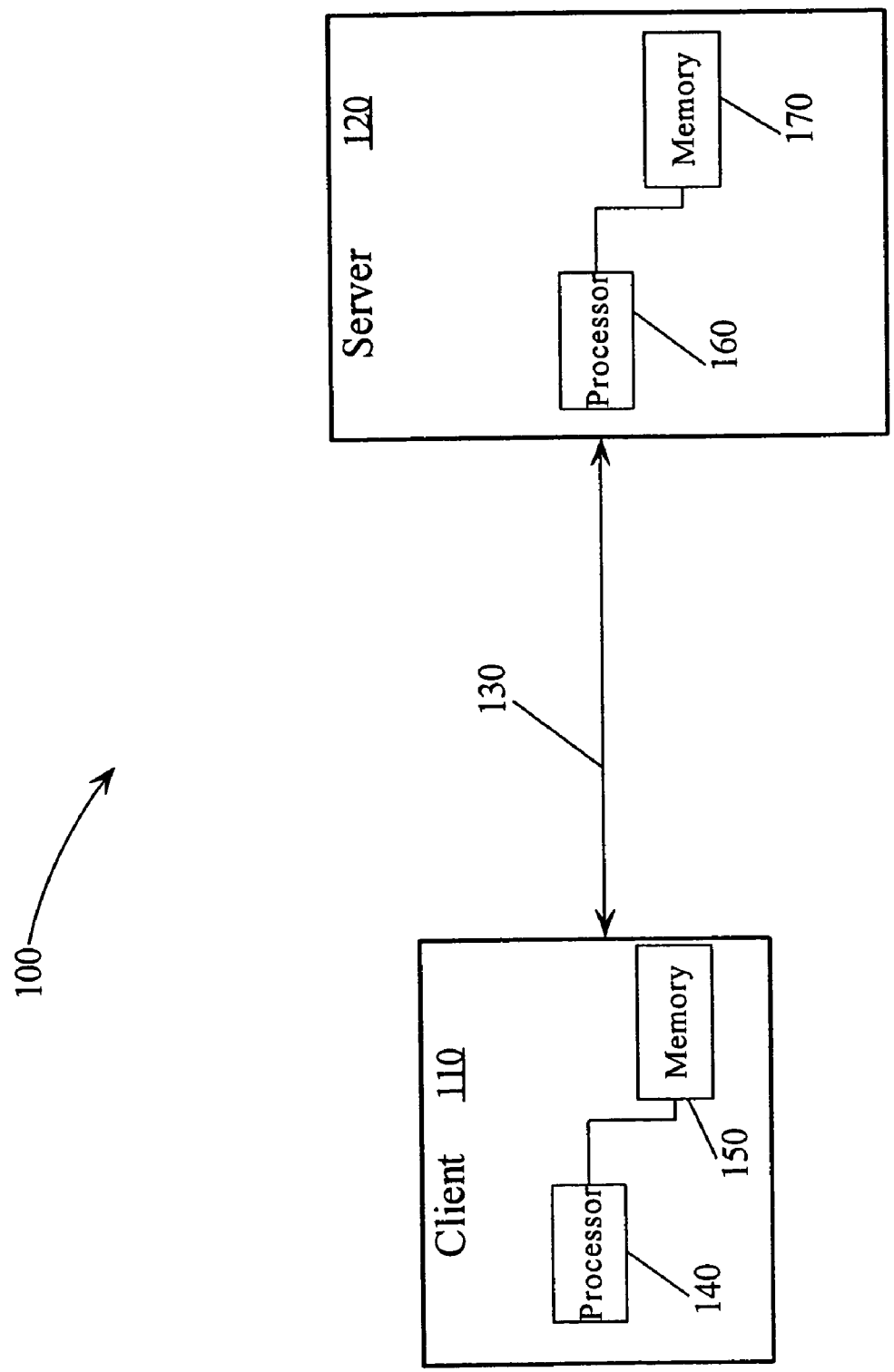
FIG. 2 is a block diagram of a networked data processing environment where the present invention can be used.

FIG. 2 shows a networked data processing environment 100 where the invention can be used. The data processing environment 100 is an arrangement of one or more client computers 110 and server computers 120 (generally "hosts") connected to each other by a network 130, for example, the Internet. Users access information and interface with network 130 and server computer 120 through client computer 110.

Client computer 110 can be utilized as part of an e-commerce system on an information network such as the Internet.

Client computer 110 includes a processor 140 that executes one or more computer program products stored in memory 150. Similarly, server computer 120 includes a processor 160 that executes one or more computer program products stored in memory 170. Client computer 110 and server computer 120 may be individually programmed to collectively execute the process or processes of the invention described herein.

Those skilled in the art will appreciate that embodiments disclosed herein may be implemented as software program instructions capable of being distributed as one or more program products, in a variety of forms, including computer program products which may be executed by processor 140 of client computer 110 and/or processor 160 of server computer 120, and that the present invention applies equally regardless of the particular type of program storage media or signal bearing media used to actually carry out the distribution. Examples of program storage media and signal bearing media include recordable type media such as floppy disks, CD-ROM, and magnetic tape transmission type media such as digital and analog communications links, as well as other media storage and distribution systems.

Additionally, the foregoing detailed description has set forth various embodiments of the present invention via the use of block diagrams, flowcharts, and/or examples. It will be understood by those skilled within the art that each block diagram component, flowchart step, and operations and/or components illustrated by the use of examples can be implemented, individually and/or collectively, by a wide range of hardware, software, firmware, or any combination thereof. The present invention may be implemented as those skilled in the art will recognize, in whole or in part, in standard Integrated Circuits, Application Specific Integrated Circuits (ASICs), as a computer program running on a general-purpose machine having appropriate hardware, such as one or more computers, as firmware, or as virtually any combination thereof and that designing the circuitry and/or writing the code for the software or firmware would be well within the skill of one of ordinary skill in the art, in view of this disclosure.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

The invention claimed is:

1. A method for providing user access to a portion of a web site implemented by an electronic commerce system, the web site being accessible by one or more users and comprising a set of on-line stores and a set of organizations, each of the said on-line stores being associated with one of the set of organizations, the method comprising the steps of:

associating each user with a unique identity in the system;
associating a user identity with one of a set of access roles for a security domain, the access role defining access privileges for the user corresponding to the user identity, the security domain comprising a subset of the set of organizations and the on-line stores associated with the organizations in the subset;
granting or denying access to a user attempting to access a portion of the web site by determining the user identity for the user and determining the access role associated with the user identity for the security domain corresponding to the portion of the web site subject to the access attempt;
in which the set of organizations is a tree structure, the step of associating a user identity with one of a set of access roles further comprises the step of associating the user identity with the access role for a selected one of the set of organizations,
the security domain includes the selected organization and those organizations in the set that are descendants of the selected organization, and
the step of granting or denying access by determining the access role associated with the user identity for the security domain comprises determining the access role for the user identity by traversing the tree structure of organizations commencing at the selected organization and including the ancestor organizations to the selected organization.

2. A method for providing user access to a portion of a web site implemented by an electronic commerce system, the web site being accessible by one or more users and comprising a set of on-line stores and a set of organizations, each of the said on-line stores being associated with one of the set of organizations, the method comprising the steps of:

associating each user with a unique identity in the system;
associating a user identity with one of a set of access roles for a security domain, the access role defining access privileges for the user corresponding to the user identity, the security domain comprising a subset of the set of organizations and the on-line stores associated with the organizations in the subset;
granting or denying access to a user attempting to access a portion of the web site by determining the user identity for the user and determining the access role associated with the user identity for the security domain corresponding to the portion of the web site subject to the access attempt;
in which the step of carrying out the determination of the access role associated with a user identity for a security domain occurs at user logon time;
in which the set of organizations is a tree structure,
the step of associating a user identity with one of a set of access roles further comprises the step of associating the user identity with the access role for a selected one of the set of organizations, and
the security domain includes the selected organization and those organizations in the set that are descendants of the selected organization.

3. A method for providing user access to a portion of a web site implemented by an electronic commerce system, the web site being accessible by one or more users and comprising a set of on-line stores and a set of organizations, each of the said on-line stores being associated with one of the set of organizations, the method comprising the steps of:

associating each user with a unique identity in the system;
associating a user identity with one of a set of access roles for a security domain, the access role defining access privileges for the user corresponding to the user identity, the security domain comprising a subset of the set of organizations and the on-line stores associated with the organizations in the subset;
granting or denying access to a user attempting to access a portion of the web site by determining the user identity for the user and determining the access role associated with the user identity for the security domain corresponding to the portion of the web site subject to the access attempt;
in which the set of access roles comprises registered customer and administrator roles:
in which the set of organizations is a tree structure, the step of associating a user identity with one of a set of access roles further comprises the step of associating the user identity with the access role for a selected one of the set of organizations, and the security domain includes the selected organization and those organizations in the set that are descendants of the selected organization.

4. The method of claim 1 in which the step of associating a user identity with one of a set of accessible roles comprises entering data in a table comprising rows comprising data representing user identity, organization, access role associations.

* * * * *